United States Patent [19]

Nawada et al.

[11] Patent Number: 4,786,787
[45] Date of Patent: Nov. 22, 1988

[54] PARKING METER AND DISPLAY DEVICE OF THE SAME

[75] Inventors: Satoru Nawada; Kazuyoshi Matsumae; Yasuhiro Nanataki, all of Tokyo, Japan

[73] Assignee: UBE Industries, Ltd., Ube, Japan

[21] Appl. No.: 141,734

[22] Filed: Jan. 11, 1988

[30] Foreign Application Priority Data

Jan. 16, 1987 [JP] Japan .................................. 62-6099

[51] Int. Cl.$^4$ .............................................. G06F 7/08
[52] U.S. Cl. ................................................... 235/381
[58] Field of Search .......................................... 235/381

[56] References Cited

U.S. PATENT DOCUMENTS 4,532,418  7/1985  Meese ................................. 235/381

Primary Examiner—Harold I. Pitts
Attorney, Agent, or Firm—Frank J. Jordan; C. Bruce Hamburg; Manabu Kanesaka

[57] ABSTRACT

A parking meter according to the present invention displays the states of use of it with the display device thereof by way of reading parking data such as residual parking time unit and parking time or the like from an IC card inserted. A display device according to the present invention has display portions formed by rotational drums which are divided in color or the like so as to make the intended display portion appear through a mask thereof by way of the rotation of the drums for the purpose of realizing the displaying.

3 Claims, 3 Drawing Sheets

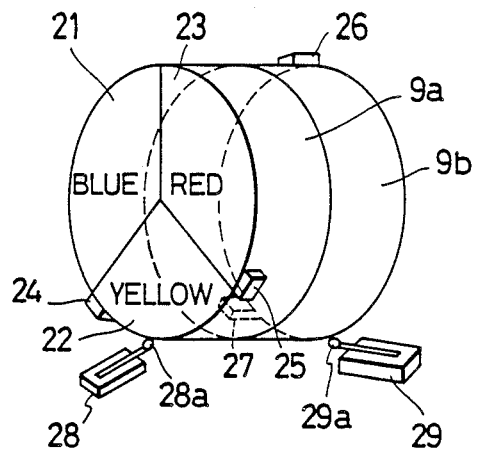
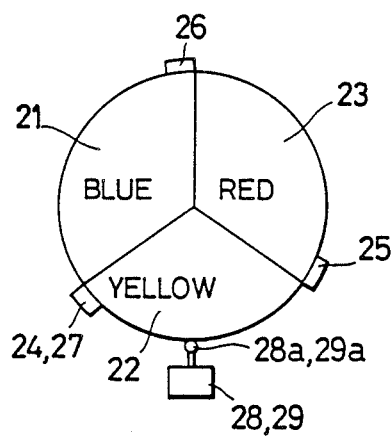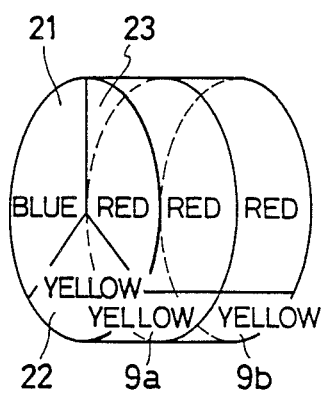

PARKING METER AND DISPLAY DEVICE OF THE SAME

FIELD OF THE INVENTION AND RELATED ART STATEMENT

This invention relates to a parking meter for setting parking time and a display device for displaying the state of the parking meter.

A conventional parking meter is operated by inserting a coin when a car is parked.

However, in the method in which coins are inserted, the accumulated coins in the parking meter may be pilfered or the parking meter device may be tampered with for the purpose of pilfery.

The inventors of the present invention disclosed in Japanese patent application No. 288959/1986 a parking meter which is actuated by a magnetic card when read by a card reader. This Japanese patent application was filed with the Japanese Patent Office on Dec. 5, 1986, and it is noted that it will not be opened to the public until June 5, 1988. The claim in the application is as follows:

A parking meter comprising: a card reader for reading data on the residual number of usable parking time units and times from a prepaid card; a central processing unit for reading said data on parking and a command pulse from a control device and for supplying a command to a motor driving portion and a display device driving circuit; a display mechanism which is driven by said motor driving portion; and a display device which is driven by said display device driving circuit.

However, in a method of the type described above in which a magnetic card is used, there is a disadvantage in regard to the security of the parking meter in that a magnetic card may be forged.

The conventional parking meter informs the user of the state of the parking meter by raising and lowering a flag. Alternatively the parking meter informs the user of the state of the parking meter by means of the pointer of an analog meter which is arranged to show when a predetermined region of the analog meter is exceeded.

It is, however, only possible to display two states of the parking meter in the aforesaid display device, and it has not been possible to display a complicated combination of states. There has therefore been a demand for a type of display device which can display a complicated combination of states simultaneously.

SUMMARY OF THE INVENTION

An object of the present invention is to provide a parking meter which involves no risk of pilfery nor an possibility of a magnetic card being forged.

Another object of the present invention is to provide a display device which is capable of displaying the various states of a parking meter.

In order to achieve the aforementioned objects, the parking meter is comprised as follows: a card reader for reading data on parking such as the residual number of parking time units and parking time from an IC (integrated circuit) card; a central processing unit for reading said parking data and a command signal from the control device and for supplying a command to a motor driving portion and a display driving circuit; a display mechanism which is driven by said motor driving portion; and a display device which is driven by said display device driving circuit.

The display device according to the present invention comprises a plurality of drums having projections; a plurality of display portions which are formed on said drum; switches which are switched on or off by said projections; and a control system for controlling said drum as a result of a combination of switching on or off of said switch.

The parking meter according to the present invention involves no fear of pilfery of coins, nor of forging of an IC card because tne IC card employed is made in a very precise manner.

Furthermore, since various data items can be written in the IC card, the parking time can be determined freely. In addition to this, since various operations ar carried out by a central processing unit, no electricity is consumed, unlike the conventional type. This means that great saving can be made in terms of energy consumption. Consequently, a battery based method can be realized without any need for an external power source.

In the display device according to the present invention, a complicated combination of states of the parking meter can be displayed thanks to it having the following structure: a plurality of displaying portions are formed on a plurality of drums having projections; switches are provided which are switched on or off by the above mentioned projections, whereby the drum is controlled to be driven to a selectable display portion of the plurality of display portions utilizing the combination of switching on or off of the switches, and the drum can be controlled to be driven to the selectable position in accordance with the state of the parking meter.

BRIEF DESCRIPTION OF THE DRAWINGS

FIG. 4 and FIG. 5 are a perspective view and a front view of a display device of the parking meter according to an embodiment according to the present invention;

FIG. 6 is a perspective view of the same according to a second embodiment of the present invention.

PREFERRED EMBODIMENTS

Figure 1:
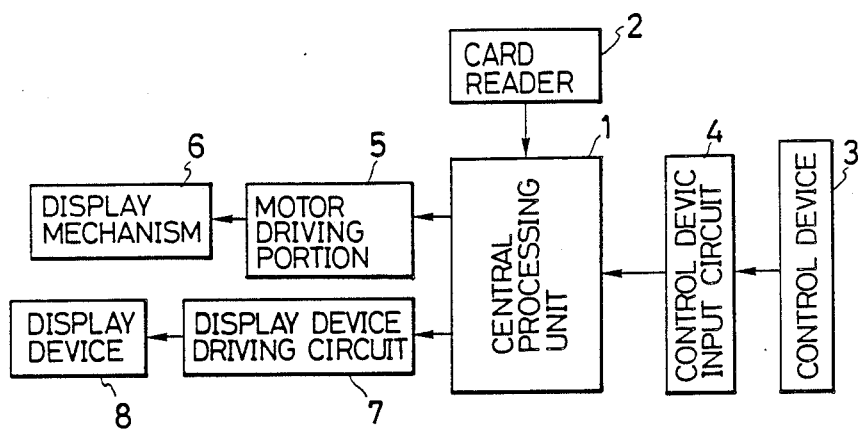
FIG. 1 is a circuit diagram for a parking meter according to an embodiment of the present invention.

In FIG. 1, reference numeral 1 represents a central processing unit. Reference numeral 2 represents a card reader, reference numeral 3 represents a control device, and reference numeral 4 represents a control device input circuit. Reference numeral 5 represents a motor driving portion, reference numeral 6 represents a display mechanism, rererence numeral 7 represents a display driving circuit, and reference numeral 8 represents a display device.

Figure 3:
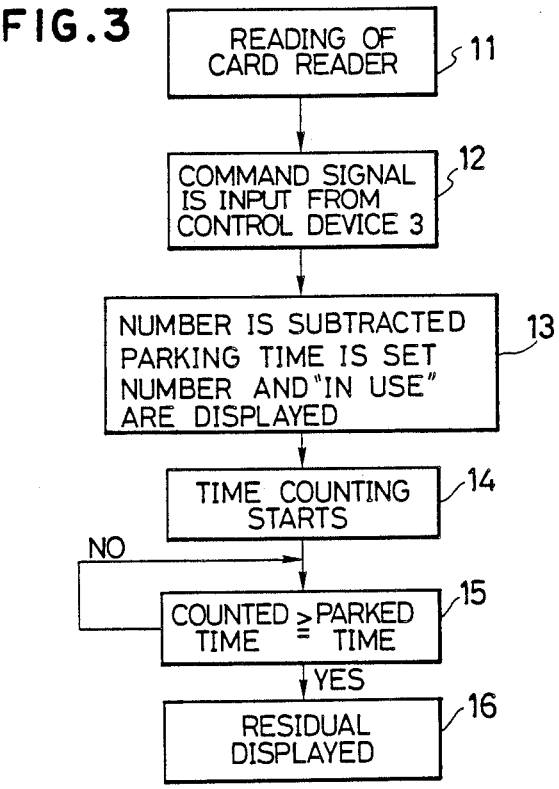
FIG. 3 is a flow chart used for illustrating the operation of the parking meter shown in FIG. 1.

The operation of a parking meter whose structure has been described above will now be described with reference to FIGS. 1 and 3.

The contents of an IC card (abbreviated to "card" hereinafter) which has been inserted into the card reader are read (step 11). On this card, a parking data such as the residual number of parking time units and parking time per one parking or the like are written. The data is arranged to be transfered to the central processing unit 1.

When a command signal for indicating the beginning of parking is input by a user through the control device 3 (step 12), this command signal is input to the central processing unit 1 through the control device input circuit 4.

Aa a result of this input, the central processing unit 1 subtracts one parking time unit from the card and the number of parking time units after it has been subtracted are displayed by the display device 8 and parking time is set. By supplying a command to the motor driving portion 5, the display mechanism 6 is driven, and the display begins to indicate that the parking meter is in use (step 13).

Then, the central processing unit 1 begins time counting (step 14).

The central processing unit 1 determines whether the counted time exceeds the parking time (step 15). If the counted time reaches the parking time, a command is supplied to the motor driving portion 5 so as to make the display mechanism 6 display the contents that the parking meter is not being used (step 16).

Figure 2:
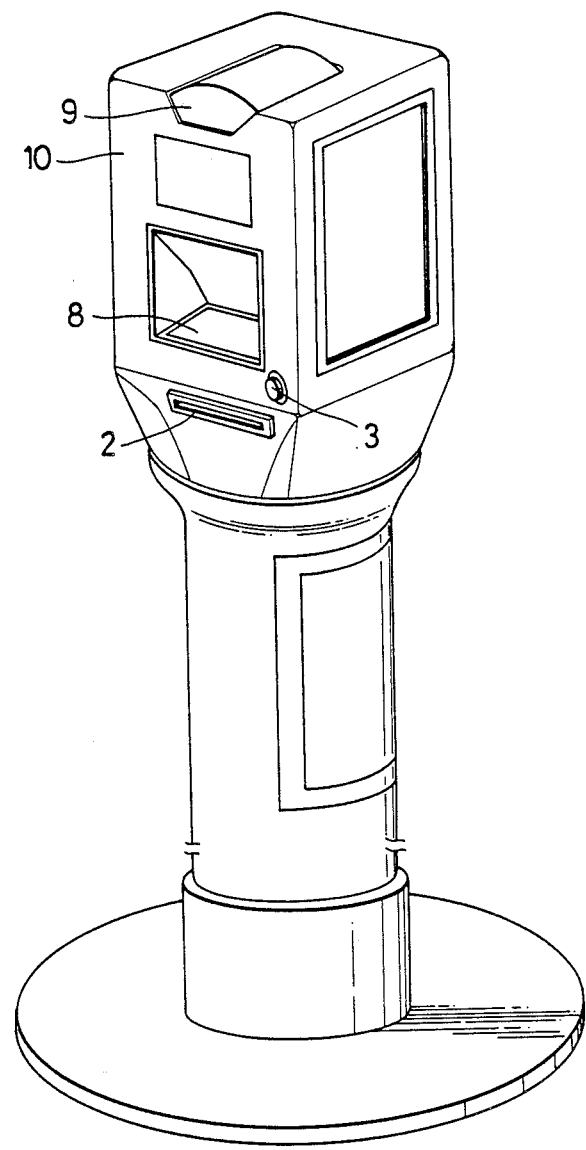
FIG. 2 is a view illustrating the outline of the parking meter.

FIG. 2 illustrates the outline of the parking meter shown in FIG. 1. In FIG. 2, reference numeral 2 represents a card reader, and reference numeral 3 represents a start switch which is the control device. Reference numeral 8 represents a display device for displaying the used number of parking time units and the residual number of parking time units. Reference numeral 9 represents a display drum which forms the display mechanism 6 for displaying the conents as "the parking meter is not used (red)", "it is used (blue)", and "the use of this parking meter is prohibited (yellow)". Reference numeral 10 represents a drum cover.

The way to operate the parking meter will now be described with reference to FIG. 2. First, the fact that the display drum 9 shows red is confirmed. If red is indicated, the card is inserted into the card reader 2. When yellow is displayed by the display drum 9, the use of the card is prohibitted. When blue is displayed by the display drum 9, the fact that the parking meter is being used is indicated. After the insertion of the card, the usable number of time units, that is the residual parking time units are displayed by the display device 8. When the start switch 3 is pushed after the display has been made, the residual number of parking time units are displayed after subtraction by "one" unit, and the display drum 9 displays blue. The card is, then, pulled out. As soon as the card is pulled out, time counting starts and allowable parking time is displayed.

If a parking exceeding a parking time unit is intended, the aforementioned operation is repeated. The repetiton is allowed to be carried out to a predetermined limit. Whenever the card is set, the residual number of parking units are updated. However, if the updating is defective, this fact is informed with a buzzar. In this case, the display 8 displays "EEEE", and the time is restored to that set previously, therefore, it may be set again within one minute.

Other types of card will now be described. First, a card for setting a parking time in a forced manner will now be described. The data for the card includes the residual number of parking time units, and parking time or the like. Furthermore, data for setting a certain parking time (usually in a short time) in a forced manner regardless to the types of the inserted card may be employed. This card is used when the parking area is crowded because many automobiles intend to park.

A card for prohibitting the use of the parking meter will now be described. When this card is used, the parking meter becomes to the state in which it is prohibited to be used. The display drum 9 displays yellow. In this case, if the card is inserted, the parking meter will not be operated.

The structure of the display device will now be in detail described. In FIGS. 4 and 5, reference numeral 21 represents a blue display portion having a 120°-sector shape written in blue. Reference numeral 22 represents an yellow display portion having a 120°-sector shape written in yellow. Reference numeral 23 represents a red display portion having a 120°-sector shape written in red. Reference numeral 24 represents a projection disposed in the yellow display portion 22 adjacent to the demarcation portion between the blue display portion 21 and the yellow display portion 22 of a front drum 9a. Reference numeral 25 represents a projection disposed in the red display portion 23 adjacent to the demarcation portion between the yellow display portion 22 and the red display portion 23 on the front drum 9a. Reference numeral 26 represents a projection disposed in the blue display portion 21 adjacent to the demarcation portion between the blue display portion 21 and the red display portion 23 on the rear drum 9b which is integrally formed with the front drum 9a. Reference numeral 27 represents a projection disposed in the yellow display portion 22 adjacent to the demarcation portion between the blue display portion 21 and the yellow display portion 22 on the rear drum 9b which is integrally formed with the front drum 9a. Reference numerals 28 and 29 represent switches which are provided with the corresponding levers 28a and 29a.

The above drums 9a and 9b are integrally formed to form the drum 9.

Since the display device is composed as described above, when each of the display portions 21 to 23 is placed at the uppermost position of the drum 9, it serves as a display showing the state of the parking meter. That is, when the red display portion 23 positions at the uppermost position of the drum 9, the color showing the state of the parking meter which can be visualized from external portion is red only, while both blue and yellow display portions are, as shown in FIG. 2, masked by a drum case 10 of the parking meter.

The operation of switches will now be described. When the projections 24 to 27 provided on the drums 9a and 9b are brought into contact with the levers 28a and 29a of the corresponding switches 28 and 29 disposed immediately beneath the drums 9a and 9b, the switches 28 and 29 are switched on. In the other cases, the switches 28 and 29 are kept to be switched off. Therefore, when the projections 24 and 27 are positioned in the lower portions of the drums 9a and 9b, the switches 28 and 29 are switched on, resulting the red display portion 23 being positioned at the uppermost position of the drum, whereby the display showing the state of the parking meter becomes red. Similarly, when the projection 25 is brought into the lower position of the drums 9a and 9b, the switch 28 is switched on, while the switch 29 is switched off, resulting the bule display portion 21 being positioned at the uppermost position of the drum, whereby the display showing the state of the parking meter becomes blue. Similarly, when the projection 26 is positioned in the lower portion of the drums 9a and 9b, the switch 28 is switched off, while the switch 29 is switched on, resulting the blue display portion 21 being positioned at the uppermost position of the drum, whereby the display showing the state of the parking meter becomes yellow.

Since each of the switches performs the aforementioned switching on or off operation, the signals corresponding to the switching on or off operation can be fed back to the central processing unit 1. As a result of this, the drums 9a and 9b can be optionally positioned in response to the command signal from the motor driving portion 5 in such a manner that the operations of the drums 9a and 9b are controlled by combining signals representing the switching on and off operations. The combination of the switching on and off in accordance with the aforementioned color display operation is shown in the following table.

TABLE

| switch 28 | switch 29 | color displayed |
|---|---|---|
| on | off | blue |
| off | on | yellow |
| on | on | red |

For example, when blue display is intended to be displayed, the drums 9a and 9b are driven by a motor, and the motor is stopped when the switch 28 is switched on and the switch 29 is switched off, whereby the blue display portion 21 is positioned at the uppermost position for the purpose of displaying the corresponding state of the parking meter.

As described above, in the present embodiment, since the states of the parking meter can be displayed by the three color tones, blue, red, and yellow, the display which was impossible to be displayed by the cnventional device in which only two states can be displayed can be displayed.

In the aforementioned embodiments, although the front portion solely servers as the display, the side surfaces of the drums 9a and 9b may serve as the display portion as a second embodiment shown in FIG. 6. In this case, in order to visualize them above the the display devcie, for example, the upper portion of the drum case 10 may be arranged to be transparent.

Although in the first and second embodiments, three color tones display method is described, the present invention is not limited to the three color tones display. If the numbers of drums, switches, and projections are increased, required number of states can be displayed in the manner similar to that described above. Furthermore, although color display method is employed in the first and second embodiments, various patterns, for example, hatched pattern facing right or left may be employed.

What is claimed is:

1. A parking meter comprising:
a card reader for reading parking data such as residual parking time units and parking time from an IC card;
a central processing unit for reading said parking data and a command signal from a control device and for supplying a command to a motor driving portion and a display device driving circuit;
a display mechanism which is driven by said motor driving portion; and
a display device which is driven by said display device driving circuit.

2. A display device for a parking meter comprising:
a plurality of drums having projections;
a plurality of display portions formed on said pulurality of drums;
switches which are switched on or off by said projections; and
a control system for controlling said plurality of drums on the basis of a combination of switching on and switching off of said switches, wherein the driving of said drum is controlled to stop at an optional position of said plurality of display portions.

3. A display device according to claim (2), wherein said drums have display portions which are each equally divided and colored or patterned in a different manner, and any one of said display portions appears through a cover so as to display said color or pattern.

* * * * *